United States Patent [19]

Minshull

[11] Patent Number: 4,887,386
[45] Date of Patent: Dec. 19, 1989

[54] FLUID MANIFOLD

[76] Inventor: Ronald G. Minshull, P.O. Box 188, Sointula, British Columbia, Canada, V0N 3E0

[21] Appl. No.: 246,267

[22] Filed: Sep. 19, 1988

[51] Int. Cl.$^4$ ............................................. A01G 29/00
[52] U.S. Cl. ........................................... 47/48.5; 47/79
[58] Field of Search ..................... 47/18, 19, 48.5, 85, 47/86, 79; 239/566

[56] References Cited

U.S. PATENT DOCUMENTS

| | | | |
|---|---|---|---|
| 178,613 | 6/1876 | Elbert | 52/717.1 |
| 1,620,933 | 3/1927 | Wilcox | 52/716 |
| 2,022,398 | 11/1935 | Beyer | 47/18 |
| 2,089,005 | 8/1987 | Sherman et al. | 52/716 |
| 2,524,246 | 10/1950 | Young | 47/18 |
| 2,539,141 | 1/1951 | Keating, Jr. | 239/552 |
| 3,080,124 | 3/1963 | Rathmann | 239/566 |
| 3,118,249 | 1/1964 | Bard et al. | 47/1.1 |
| 3,205,619 | 9/1965 | Henry | 47/9 |
| 4,309,843 | 1/1982 | Kato | 47/18 |
| 4,555,870 | 12/1985 | McKinnon et al. | 49/46.2 |
| 4,570,383 | 2/1986 | Adell | 49/462 |
| 4,620,390 | 11/1986 | Mekler | 47/86 |
| 4,624,093 | 11/1986 | Gibson | 52/716 |
| 4,695,499 | 9/1987 | Whitener | 428/122 |

OTHER PUBLICATIONS 2,539,141, Jan. 23, 1951—G. W. Keating, Jr.

Primary Examiner—Robert A. Hafer
Assistant Examiner—Charles H. Sam
Attorney, Agent, or Firm—Bull, Housser & Tupper

[57] ABSTRACT

An apparatus for transmitting fluid includes a first panel member having first and second sheet portions. The first sheet portion has a plurality of apertures therein, and the second sheet portion is spaced apart from the first sheet portion by a spacing structure to define an interior space therebetween. At least one of the end portions of the panel has a first edge opening. The first edge opening and the plurality of apertures communicate with the interior space. The apparatus also includes a first manifold member having a wall defining an inside space and having interior and exterior wall portions. The manifold member further includes an end opening communicating with the inside space and a connecting structure for sealably connecting the manifold member to the first panel member. The connecting structure includes at least one opening in the wall for communication between the inside space and the first edge opening of the first panel member. The panel member can be assembled with similar panel members and manifold members to produce an assembly for supplying gas or liquids to a material, or removing gas or liquid from a material.

22 Claims, 5 Drawing Sheets

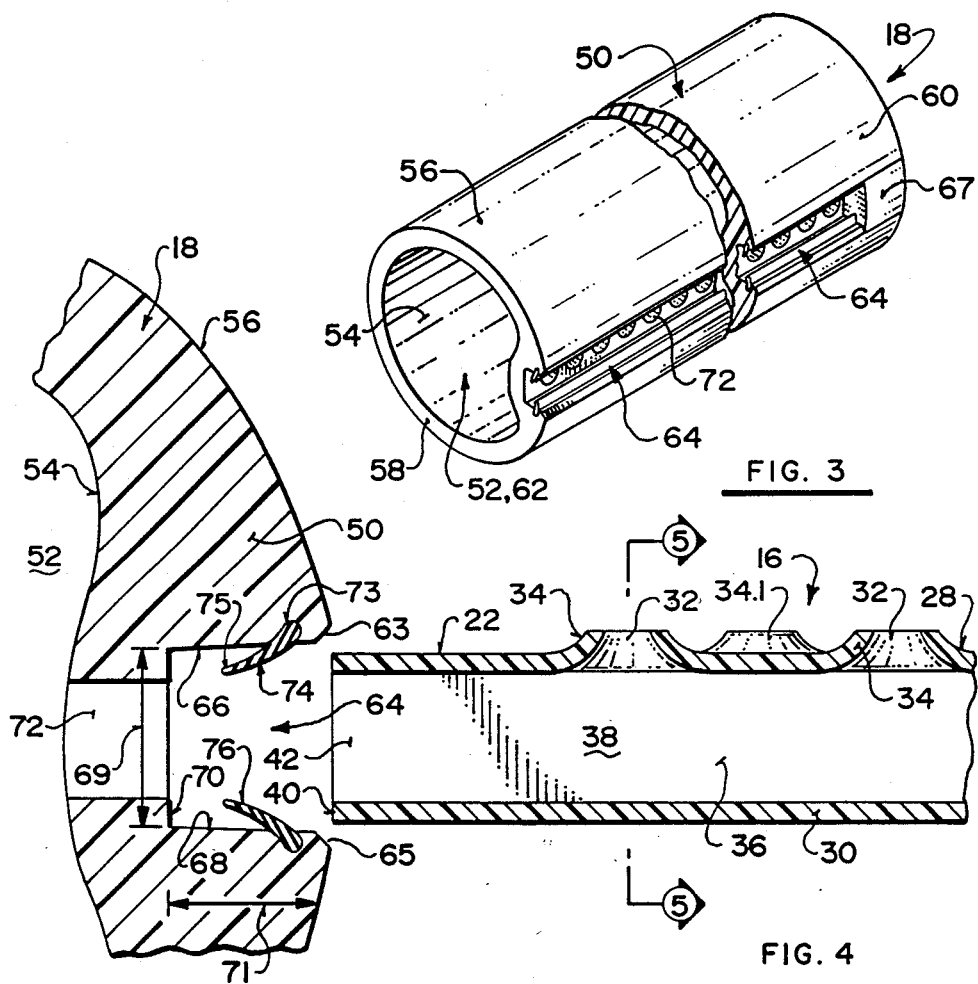
FIG. 3
FIG. 4
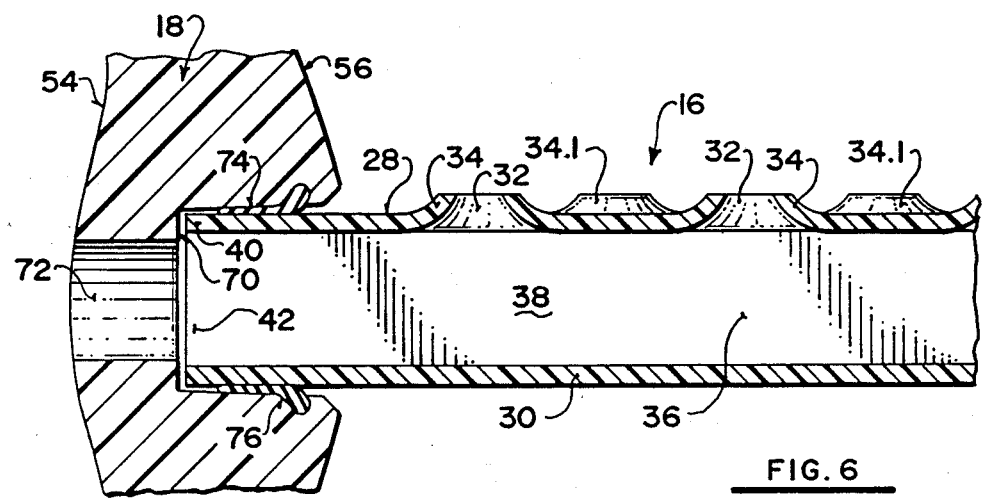
FIG. 6

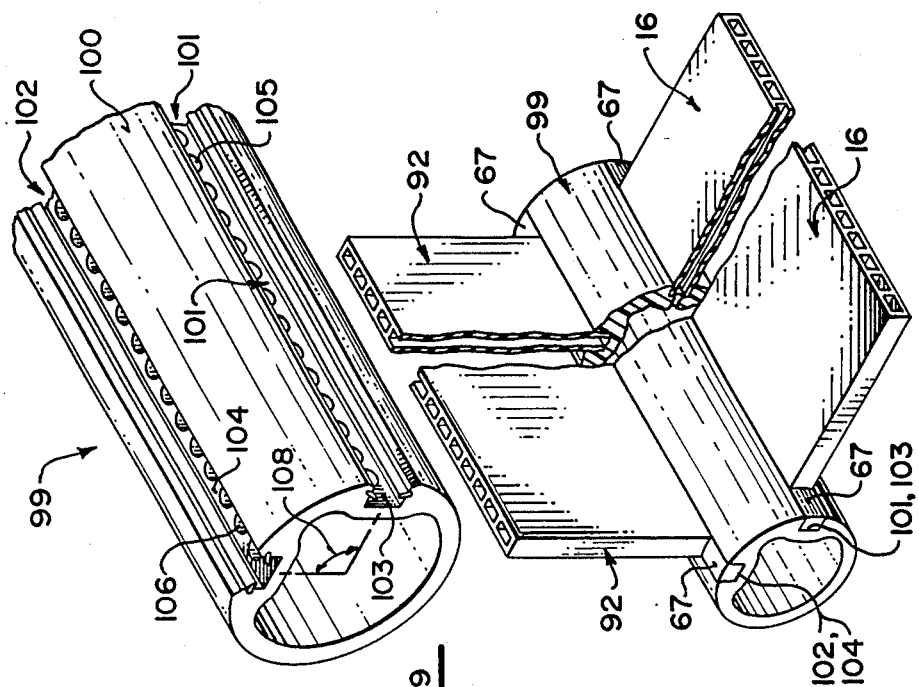
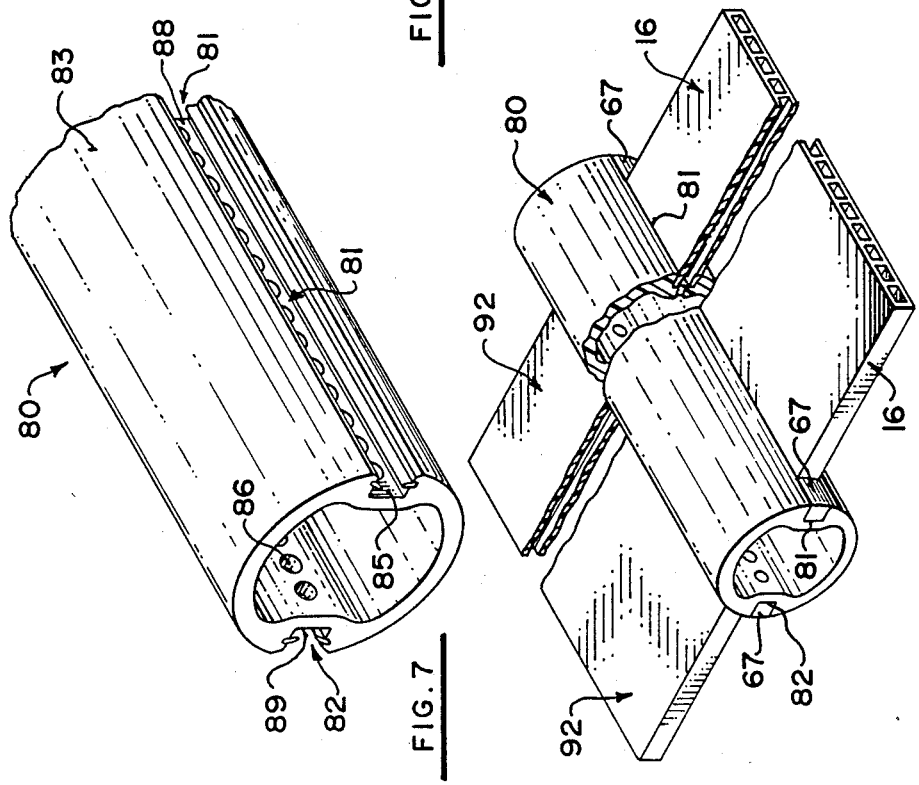

U.S. Patent   Dec. 19, 1989   Sheet 5 of 5   4,887,386
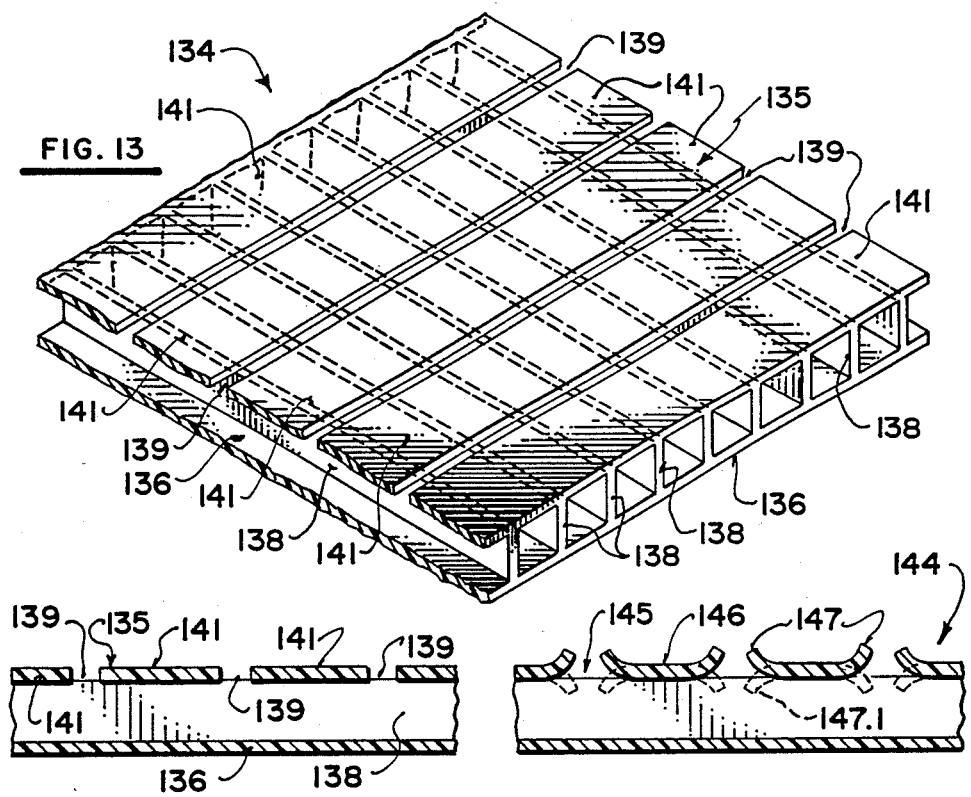
FIG. 13
FIG. 14
FIG. 15
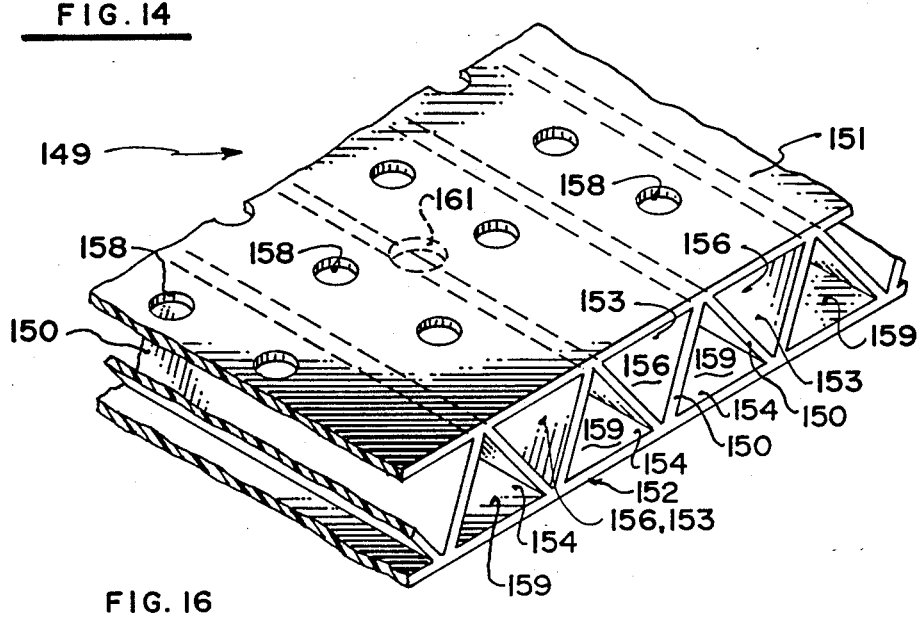
FIG. 16

FLUID MANIFOLD

FIELD OF THE INVENTION

The invention relates to an apparatus for supplying fluid to, or removing fluid from any material, for example for watering or aerating roots of plants in a plant growing medium, or for removing undesirable liquids or gases from a waste dump etc.

BACKGROUND OF THE INVENTION

In a greenhouse environment it is often desirable to disperse fluids through or remove fluids from a growing medium such as soil containing plants. The capability of dispersing fluids through the growing medium allows the roots of plants to be supplied with air, water or solutions containing fertilizer or insecticides etc. The capability of removing fluids from a growing medium allows water saturated soil to be drained as required.

U.S. Pat. No. 2,022,398 (Beyer) discloses a plurality of panel members having parallel conduits extending between opposite edges thereof. The panel members are made of a heavy, porous material, namely burnt clay, which absorbs moisture and thus can be used to drain moisture from a growing medium. Because the material is porous, it would be difficult to control gas or liquid flow.

U.S. Pat. No. 4,309,843 (Kayto) discloses a plant cultivation device comprised of a corrugated plate having drainage holes positioned within parallel grooves therein. The corrugated plate rests on hollow concrete blocks arranged similar to drain tiles which carry away water seeping through the drainage holes. Sand between the blocks also helps to carry away water. This device would appear not to allow soil to be watered due to the sand between the concrete blocks and due to the lack of means for supplying water to the device.

U.S. Pat. No. 2,524,246 (Young) discloses a greenhouse bench bed having a corrugated aluminum bottom provided with perforations to drain excess water. The water drains directly below the bed and onto the ground. This device would appear to be incapable of introducing water to the bed through the perforations.

U.S. Pat. No. 3,118,249 (Bard) discloses a mushroom tray having a bottom sheet provided with a plurality of perforations. The perforations permit passive flow of air into the growing medium carried on the sheet. Presumably, these perforations may also be used to drain excess water. The device would appear to have no means for conducting away drainage water from the perforations and would appear to be incapable of introducing water through the perforations to the growing medium.

It is common for undesirable gases or liquids to be generated in municipal garbage dumps, industrial waste disposal sites etc. Such gases or liquids are commonly flammable, obnoxious smelling, toxic, etc. and the disposal of such gases or liquids has, in the past, been costly and often relatively inefficient. Gases generated in garbage dumps tend to collect in pockets, and/or leak through porous material to atmosphere, commonly producing foul smells, with a risk of explosions as the gases are commonly flammable. It is well known to provide a matrix of vertical stand pipes inserted into the material so as to collect the gases, and to permit safe burning of such gases. The cost of installing the matrix of vertical stand pipes is high and cost considerations dictate that there will be areas without adequate ventilation, with a consequent risk of excessive build up of gases and a high risk of explosion. Also, liquids leaching away from such material have, in the past, been drained by perforated drain tile or pipes buried in the material. Again, due to cost considerations, the pipes are disposed in a matrix and many areas of the dump are not adequately drained. This results in excessive build up of toxic liquids, which have been known to leach into ground water and contaminate water supplies, and adjacent land used for other purposes.

To the inventor's knowledge, the installation of water drainage or supply means to growing media in greenhouse applications, and the removal of undesirable gases or liquids from garbage dumps requires different types of apparatus which, in some applications, can be costly to install, and does not always perform adequately. It is desirable to provide a low cost, versatile device which can be used for either application above, and has sufficient versatility to accommodate the broad requirements of this wide range of applications.

SUMMARY OF THE INVENTION

An apparatus according to the invention reduces some of the problems addressed by the prior art by providing a simple, low cost fluid manifold which can be used to either remove fluid from, or disperse fluid into surrounding medium. The apParatus can utilize easily available, low-cost lightweight panels which can be re-manufactured to provide a large perforated area for transmission of fluids. Much of the apparatus also uses conventional plumbing pipes and connections, reducing manufacturing costs and simplifying assembly and installation.

The apparatus according to the invention includes a first panel member and a first manifold member. The first panel member includes first and second sheet portions, the first sheet portion having a plurality of apertures therein. The first panel member also includes spacing means for maintaining the second sheet portion spaced apart from the first sheet portion to define an interior space therebetween. The panel member also has first and second end portions in which at least one of the end portions has a first edge opening, the first edge opening and the plurality of apertures communicating with the said interior space. The first manifold member includes a wall with an interior portion defining an inside space, and an exterior portion. The manifold member also has a end opening communicating with the inside space and a connecting means for sealably connecting the manifold member to the first panel member. The connecting means includes at least one opening in the wall for communication between the inside space and the first edge opening of the first panel member.

A detailed disclosure following, related to drawings, describes a preferred embodiment of the invention which is capable of expression in structure other than that particularly described and illustrated.

BRIEF DESCRIPTION OF THE DRAWINGS

FIG. 3 is a fragmented, simplified, isometric view of a first fluid manifold member according to a first embodiment of the invention;

FIG. 4 is a simplified fragmented cross-sectional view of a portion of a wall of the first manifold member adjacent an edge of the first panel member, prior to connection between the manifold member and the panel member;

FIG. 6 is a simplified fragmented cross-sectional view of a portion of the wall of the first manifold member, showing the first panel member co-operating with the manifold member;

FIG. 7 is a fragmented, simplified, isometric view of a portion a second embodiment of the fluid manifold member according to the invention;

FIG. 8 is a fragmented, simplified isometric view of the second embodiment of the fluid manifold member connected to the first and second panel members;

FIG. 9 is a fragmented, simplified isometric view of a third embodiment of the fluid manifold member according to the invention;

FIG. 10 is a fragmented, simplified, isometric view of the third embodiment of the fluid manifold member connected to the first and second panel members;

FIG. 13 is a fragmented, simplified, isometric view of a third embodiment of a panel member according to the invention;

FIG. 14 is a simplified section along a duct of the panel of FIG. 13;

FIG. 15 is a simplified section along a duct of a fourth embodiment of a panel member;

FIG. 16 is a fragmented, simplified isometric view of a fifth embodiment of the panel member according to the invention.

DETAILED DISCLOSURE

FIGS. 1 through 6

Figure 1:
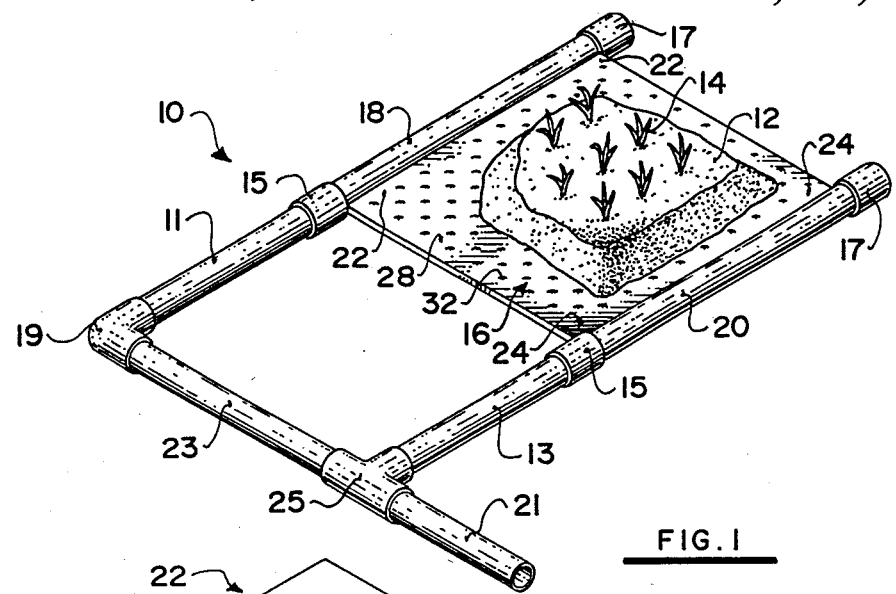
FIG. 1 is a simplified, isometric view of an apparatus according to a first embodiment of the invention, the apParatus being shown in use with a growing medium.

Referring to FIG. 1, an apparatus for conducting fluid is shown generally at 10. The apparatus is shown in a configuration for draining water from a bed of soil 12 in which plants 14 are growing. The apparatus 10 includes a first panel member 16 connected between similar first embodiments of a manifold member 18 and 20. The manifold member 18 is connected by a common pipe connector sleeve 15 at one end to a first conduit 11 and is sealed by a common pipe cap 17 or other suitable device at the other end. The manifold member 20 is also connected by a pipe connector 15 at one end to a second conduit 13 and is similarly sealed by a similar pipe cap 17 at its other end. A T-pipe coupling 25, and an L-pipe coupling 19 are connected to outer ends of the conduits 11 and 13 respectively as shown, with a connecting pipe 23 extending therebetween. The T-pipe coupling 25 is itself connected to a main pipe 21 which can connect to similar units as described, or to a pump or pump means, not shown. The conduits 11, 13, 21 and 23, couplings 15, 19 and 25, and the end caps 17 are all common piping connections, such as used in domestic or industrial water supplies and are commonly fabricated from a tough plastic material which can be joined using adhesives. This simplifies and reduces costs of installation.

Figure 2:
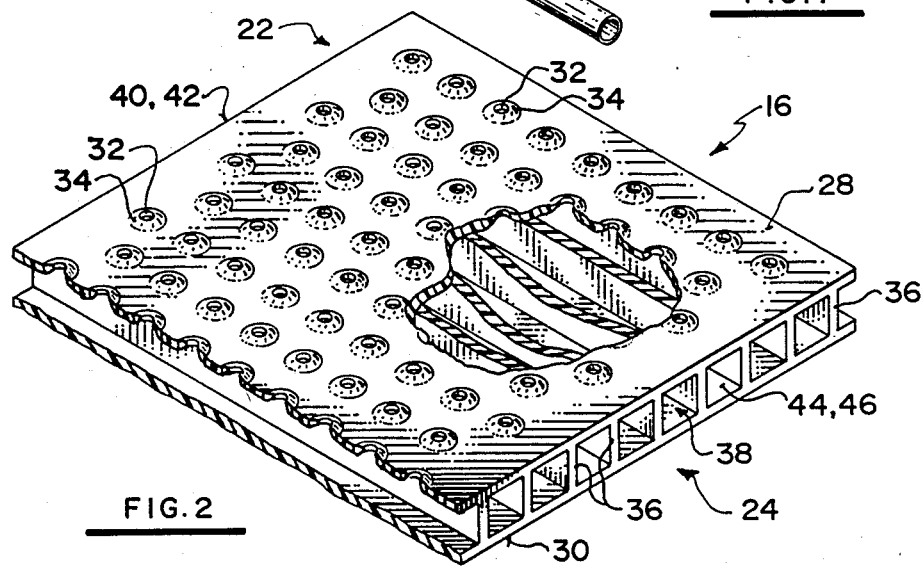
FIG. 2 is a fragmented, simplified, isometric view of portion of a first panel member according to the invention.

Referring to FIG. 2, the first panel member 16 has first and second end portions 22 and 24 disposed at opposite ends thereof. Both of the end portions have a plurality of edge openings which will be discussed in greater detail below.

The panel member 16 further includes first and second spaced apart sheet portions 28 and 30 which define an interior space therebetween. A plurality of spaced apart parallel partitions 36 extend between the first and second sheet portions 28 and 30 within the interior space therebetween. The partitions also extend the length of the panel from the first end portion 22 to the second end portion 24.

The basic structure of the panel member 16 as described above resembles several prior art commercial products, which are sold under the trade marks "Exelite", "Polygal", "Tuffak Twinwall", "Coroplast Polyflute", etc. Such products are extruded plastic sheets which are sold for a multitude of purposes requiring relatively stiff, lightweight weather-proof, low cost panels, and are often used in the advertising field. Because the panels are produced in large quantities, their cost is relatively low, and being plastic are highly corrosion resistant and are suitable for many applications, provided ambient temperatures do not exceed the softening point on the plastic. Similar but heavier sheets can be extruded in aluminum.

The panel member 16, is re-manufactured for a specific application of the present invention by forming in the first sheet portion 28 a plurality of apertures 32 arranged in staggered rows extending between the first and second end portions. Each aperture is at the centre of a dimple 34 which projects upwardly and outwardly from the sheet to pour fluid such as water or air through the first sheet portion. The dimples project upwardly in this embodiment to reduce the fine dirt particles plugging the aperture as would otherwise tend to happen. The second sheet portion 30 is of solid, non-perforated construction and is void of apertures thereby sealing one side of the interior space.

The partitions are flat, straight strips and form a plurality of ducts such as first duct 38 for transmitting fluid from the apertures through the interior space. Each duct, as exemplified by duct 38, has a first end portion 40 having a respective edge opening 42 in the first end portion 22 of the panel. A second end portion 44 of each duct has a respective edge opening 46 in the second end portion 24. The apertures 32 in the first sheet portion 28 are aligned in rows along each duct, i.e. parallel to the partitions, such that each duct is in communication with a plurality of apertures. This allows fluid from the plurality of apertures in communication with a particular duct to be transmitted by that duct to corresponding edge openings in the first and second end portions 22 and 24 of the panel. Fluid received in the ducts from the apertures passes through the edge openings, and vice versa.

Figure 5:
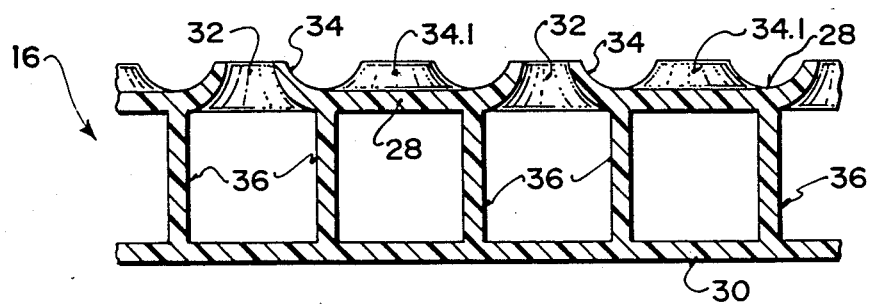
FIG. 5 is a simplified fragmented cross-section on line 5—5 of FIG. 4.
Figure 11:
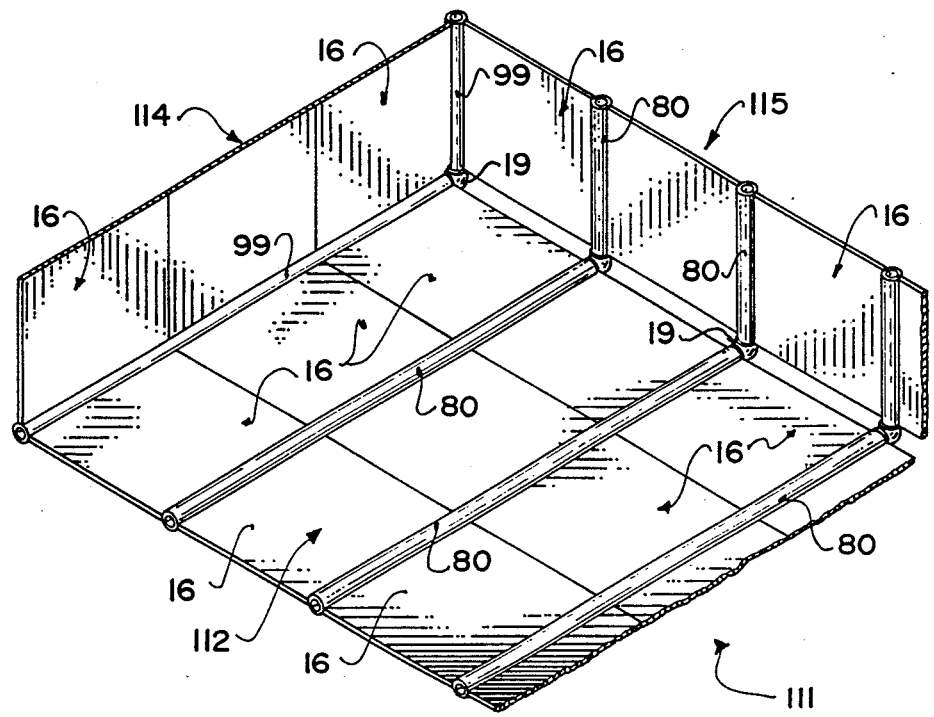
FIG. 11 is a fragmented, simplified isometric view of several embodiments of fluid manifold members connected together to form an assembly for distributing fluid to, or removing fluid from, a large area.

As seen in FIGS. 4 and 5, the dimples 34 are disposed in rows in communication with particular ducts and are staggered with respect to dimples disposed in adjacent rows in communication with adjacent ducts. To optimize "packing density" of dimples and apertures in the first sheet portion, the dimples and apertures in a row communicating with one particular duct are spaced relatively close together, with sufficient space therebetween to receive a further dimple, which would be in an adjacent row. Thus the dimples are aligned on a diagonal grid on the first sheet portion to provide sufficient material between the dimples without undue weakening of the first sheet portion. The relative position and spacing between adjacent dimples is best seen in FIGS. 4 and 5, which shows that curvatures of sidewalls of the dimples are relatively smooth to maximize strength. While dimples surrounding apertures are preferred to provide local strengthening of the sheet portion and to improve fluid flow, dimples are not essential and the apertures can be within a flat sheet. Furthermore, the apertures can be different shapes and/or sizes to proportion the flow relative to specific areas of the panel members.

Referring to FIG. 3, the first manifold member 18 is shown in greater detail, and has a generally elongated, cylindrical wall 50 which encloses an inside space 52. The wall has an inside wall portion 54 and an outside wall portion 56. The inside portion faces the enclosed inside space and the outside portion faces the external surroundings. The wall also has first and second end portions 58 and 60 which have respective first and second end openings, the first end opening 62 being shown in FIG. 3, the second end opening not being shown.

Referring to FIGS. 3 and 4, outside wall portion 56 of the first manifold member 18 also has a first slot 64 for receiving an end portion such as the first end portion 22 of the first panel member 16. The slot extends longitudinally along the outside portion 56 of the wall 50 between the first and second end portions 58 and 60. The slot has oppositely facing bevelled outer edges 63 and 65, side portions 66 and 68 and a first bottom portion 70. The side portions are spaced apart by a slot width 69 to receive the first end portion 22 therebetween, and can taper slightly inwardly to facilitate insertion of the panel member. Depth 71 of the first slot is the distance between the first bottom portion 70 and the outside portion 56 of the wall and is selected to enable the first end portion to be held firmly within the slot.

The bottom portion of the slot 64 has a plurality of generally parallel openings 72 extending through the wall 50 and spaced along the length of the slot When the first end portion 22 of the panel member 16 is inserted in the slot, the openings 72 are in communication with the edge openings, such as edge opening 42 of the panel member. Thus, fluid in the ducts of the panel member can pass through the edge opening 42, through one or more of the plurality of openings 72 in the wall of the manifold, and into the inside space 52 enclosed by the wall of the manifold. The fluid is then conducted out of the inside space by the first conduit 11 shown in FIG. 1.

As seen in FIG. 3, the outside wall portion 56 of the manifold member 18 is cyclindrical with the exception of the slot 64, and is complementary to the bore of the standard pipe coupling 15, as seen in FIG. 1, to permit easy connection thereto. When the member 18 is received as a tight fit in the bore of the coupling 15, the slot 64 provides an undesirable clearance between the wall 56 and the bore of the coupling. To prevent leakage of fluid through an end portion of the slot 64 when the member 18 is installed in the coupling, a rectangular slightly resilient plug 67, shown in FIG. 3 only, is inserted, and preferably bonded, as a tight fit in the slot so as to seal the space between the slot and the coupling. A similar plug, not shown, would be required to seal ends of the manifold members when closed by the caps 17, as shown in FIG. 1.

Referring to FIGS. 4 and 6, the first slot 64 includes generally similar first and second resilient flaps 74 and 76 located adjacent the exterior wall 56 on the side portions 66 and 68 of the slot. The resilient flap 74 has a fattened or bulbous root portion 73 which is received in a complementary opening adjacent to the outside wall portion of the first side portion 66 of the slot. The bulbous root portion 73 tapers outwardly along length of the flap 74 to a feathered tip portion 75 which, in an unstrained condition is generally straight and inclined inwardly as seen in FIG. 4. For improved resilience and sealing, the flaps 74 and 76 are manufactured from a flexible, high-friction, rubber-like material such as "Neoprene" which deforms relatively easily and has a high coefficient of friction when contacted with the panel member.

To insert the panel member 16 into the slot 64, the member 16 is initially positioned as shown in FIG. 4. The first end portion 40 of the panel member is initially guided into the slot by the bevelled outer edges 63 and 65 of the slot, after which it contacts the flaps 74 and 76 which are initially extending inwardly as shown in FIG. 4. As the first end portion of the panel member is inserted into the slot, the first end portion slides along the flaps 74 and 76, deflecting the flaps which eventually assume a position as shown in FIG. 6 at which the first end portion is adjacent to the bottom wall 70 of the slot. In this position, the edge openings 42 of the ducts 38 within the panel are generally aligned with the openings 72 in the wall of the manifold member. Because the partitions 36 are relatively thin, and the wall material between adjacent openings 72 is also relatively thin, exact registration of a particular opening 72 with a particular duct 38 is unnecessary. The resilient flaps provide a seal to prevent fluid from leaking out of the slot while also providing a compressive force to the first end portion to hold the end portion in the slot. It can be seen that the slot 64 and the two resilient flaps 74 and 76 serve as connecting means sealably connecting the manifold member to the first panel member. It can be seen that the connecting means includes at least one opening in the wall of the manifold member for communication between the inside space and the first edge opening 42 of the first panel member 16.

OPERATION

Referring to FIG. 1, the first panel member 16 is connected to the first manifold member 18 by inserting the first end portion 22 of the panel into the slot 64 in the first manifold 18. Similarly the second end portion 24 is inserted into a similar slot in the second manifold member 20.

The first end portion of the first manifold member 18 is then connected to the first conduit 11 by the common pipe coupling 15 in a manner similar to joining two pipes of similar diameter together. The second end portion of the member 18 is sealed by the common pipe cap 17, normally used to seal an end of a pipe. Similarly, the first end portion of the second manifold 20 is connected to the second conduit 13 by a similar common pipe coupling 15 and is sealed at its second end portion by the similar cap 17. The first and second conduits are connected to a connecting pipe 23 using the "L-coupling" 19 and "T-coupling" 25 in a manner for joining conduits commonly known in the art. The connecting pipe is for disposal of any fluid collected by the apparatus.

Referring to FIGS. 1 and 2, water soaking through the growing medium 12 drains through the apertures 32 in the first sheet portion 28. The water then falls into the ducts such as duct 38 between the first and second sheet portions. Once in the ducts, the ducts direct the water to the first and second edge openings 42 and 46 where the water passes through the openings 72 into the first and second manifold members 18 and 20. From the first and second manifold members, the water flows through the first and second conduits 11 and 13 into the connecting pipe 23 and out of the main pipe 21. Flow can be by gravity for most purposes, or could be assisted by a small pump.

Alternatively, water may be delivered to the growing medium 12 by connecting the main pipe 21 to a source of water so as to reverse flow of water in the ducts, pipes and manifold members. Water now flows through the main pipe through the connecting pipe 23, enters the first and second conduits 11 and 13, into the inside spaces of the first and second manifold members 18 and 20, through the openings 72 in the manifold members and through the edge openings 42 of the panel member. Upon passing through the edge openings, the water passes along the ducts 38 and can flow freely through the apertures 32 in the first sheet portion and into the growing medium.

Similarly, air may be extracted from the soil by connecting the drain pipe to a vacuum pump. The vacuum pump causes air to be drawn through the apertures 32 in the first sheet portion 28, then through the ducts 38 of the panel member, then through the openings 72 in the manifolds, through the first and second conduits 11 and 13, and out through the connecting pipe and main pipe to the vacuum pump. The vacuum pump may therefore be used to dry the growing medium by first removing water, and then drying the growing medium with a flow of air.

Air may similarly be introduced into the growing medium by connecting the main pipe 21 to a source of pressurized air. The source of air will blow air into the main pipe and into the first and second conduits 11 and 13. From the conduits, the air flows into the first and second manifolds 18 and 20 where the air is conducted through the openings 72 in the manifold and through the edge openings 42 and 46 of the panel member. The air is therefore in the ducts 38 between the first and second sheet portions 28 and 38 of the panel 16 and can escape through the plurality of apertures 32 in the first sheet portion into the growing medium 12.

The application of this apparatus is not limited to use in growing media alone. The apparatus may also be used to remove harmful gases or liquids in areas subject to leaching etc., as found in common municipal garbage dumps, industrial waste areas etc. or in other applications as will be described.

ALTERNATIVES

FIGS. 7 and 8

Referring to FIGS. 7 and 8, a second embodiment 80 of a fluid manifold member is generally similar to the first member 18 but in addition can cooperate with two panel members as follows. The embodiment 80 has an outside wall portion 83 having generally similar first and second longitudinal slots 81 and 82 spaced diametrically opposite to each other. The slots 81 and 82 have pluralities of openings 85 and 86 disposed longitudinally along respective bottom portions 88 and 89 of the slots 81 and 82 respectively. The slots 81 and 82 are essentially identical to the slot 64 shown in FIG. 4.

As best seen in FIG. 8, first and second panel members 16 and 92 are received in the respective slots 81 and 82 and extend diametrically outwardly so as to be essentially within the same plane. In this way, a pair of aligned, co-planar panel members can receive fluid from, or transfer fluid to the same manifold member disposed between the two panels.

FIGS. 9 and 10

A third embodiment 99 of a fluid manifold member has an outside wall 100 having similar first and second longitudinal slots 101 and 102 extending longitudinally along the wall. The slots 101 and 102 have respective bottom walls 103 and 104 provided with rows of respective openings 105 and 106, so as to be generally similar to the previously described slots. The slots are spaced peripherally on the wall 100 at an angle 108, which in this instance is ninety degrees, and receive first and second panel members 16 and 92 disposed at a similar angle to each other as shown in FIG. 10. Clearly, the angle 108 can be selected for any particular purpose.

FIG. 11

A corner portion 111 of an assembly of manifold members and panel portions is shown to illustrate one use of the several embodiments of the invention. The portion 111 is a portion of a generally rectangular shaped "tray", not shown, which has a bottom wall assembly 112 and four surrounding vertical wall assemblies, portions of two walls 114 and 115 only being shown. The total assembly can be a closed rectangle, used to contain growing medium, for agricultural purposes, or a waste-dump area for containing waste that generates noxious gases or liquids which require controlled removal. The assembly can be easily transported and assembled on site from the main components of the invention as previously described, and clearly can be easily tailored to fit the available site size.

The sidewall assembly 114 has a plurality of panel members 16 disposed generally vertically and interconnected along upper edges thereof by a continuous length of a first embodiment of the manifold member 18. Abutting edges of adjacent panels 16 can be sealed with self-adhesive tape if fluid and/or gas integrity is required. Lower edges of the plurality of panels 16 are fitted in one slot of a third embodiment 99 of the manifold member which extends along a corner of the assembly 111. The remaining slot of the third embodiment 99 receives a similar plurality of panels 16 which extend horizontally to be received in one slot of a second embodiment manifold member 80 which extends the same length as the third embodiment member 99. An opposite slot of the manifold member 80 receives a further plurality of panels 16 which extends similarly to a second embodiment manifold member 80. Again further panels 16 extend into a second embodiment 80 towards a final edge of the assembly, not shown. An end wall assembly 115 similarly has a plurality of vertically disposed panels 16 which are interconnected at adjacent edges by second embodiments 80 of the manifold member, which can be connected into the second embodiment 80 of the bottom wall assembly 112 so as to provide fluid transfer along both the horizontal bottom wall and vertical end wall 115. It can be seen that many different shapes and sizes of assemblies of the panels of manifold members can be easily assembled for specific applications.

FIG. 12

A second embodiment panel member 121 has first and second sheet portions 123 and 124 and a plurality of partitions 126 extending between the sheet portions and spacing them apart to define an interior space therebetween. The first sheet portion 123 has a plurality of apertures 128 therein, the apertures being disposed within dimples 129 which extend upwardly and inwardly into the space between the sheet portions. In contrast with the panel member 16 of FIG. 5, which has outwardly extending dimples with apertures, the panel member 121 has inwardly extending dimples with apertures. Similarly to the dimples 34 of FIG. 5, the dimples and apertures are disposed in a plurality of rows extending along and parallel to the partitions 126, so that each duct is in communication with a plurality of apertures. The dimples and apertures in one row are staggered relative to the dimples and apertures in an adjacent row so as to increase packing density of the apertures without undue weakening of the structure, and to improve fluid transmission relative to the panel member. The panel member 121 has first and second end portions, not shown, which are generally similar to the end portions of the panel member 16, and in which at least one of the end portions has edge openings which communicate with manifold members as previously described. Preferably, overall thickness of the panel members 16 and 121 are equal so as to permit interchangeability, depending on the application of the panel member.

The alternative panel member 121 would normally be used in an application where gases are to be removed from a material beneath the panel member. For example, to remove noxious gases from a garbage dump or the like, assemblies of alternative panel members 121 and appropriate manifold members are interconnected to form an upper surface or roof lying on top of the garbage dump material. The top of the material should be relatively level so that the lower first sheet portion is in direct contact with the upper surface of the garbage material, so as to reduce the size of any pockets of gas that might otherwise collect between the material and the panel member The manifold members interconnecting the panel members are connected together to a common collecting pipe, which itself would communicate with the suction pump, not shown, to remove the gases. A similar assembly of panel members, manifold members and pump could be used in a basement of a dwelling to remove health hazardous Radon gas that has been found to accumulate in some areas. The assembly of alternative panel members and manifold members could be laid directly on the sub-soil of the basement, and form a sub-base for a floor which would be mounted on, or spaced a short distance above, the panel member, depending on the strength of the panel members.

FIGS. 13 and 14

A third embodiment 134 of a panel member has first and second sheet portions 135 and 136 and a plurality of spaced parallel partitions 138 extending therebetween and serving as spacer means for maintaining the sheet portions spaced apart to define an interior space therebetween. The first sheet portion 135 is divided by a plurality of narrow parallel slits or grooves 139 which divide the sheet into a plurality of co-planar sheet segments 141. The grooves would typically be cut into the first sheet portion 135 after manufacturing the panel member, and thus care would be exercised to ensure that the depth of cut to produce the groove does not exceed thickness of the first sheet portion 135. As seen in FIG. 14, the depth of the groove 139 is such as to produce a clean cut between adjacent sheet segments 141, without cutting into the partitions 138, thus reducing any weakening effect of the grooves 139.

It is anticipated that providing grooves in the first sheet portion is more appropriate for an extruded aluminum panel member, rather an extruded plastic member due to the high strength of the aluminum panel member. Furthermore, in a manufacturing process, in all likelihood the aluminum panel member would present more difficulty to a machine for producing dimples and corresponding perforations, whereas the plastic sheet would present little difficulty to such a machine. This is particularly true with machines using heat and pressure means known in the trade to produce dimples and Perforations in the plastic sheet.

FIG. 15

A fourth embodiment of the panel member 144 is generally similar to the third embodiment 134 of FIGS. 13 and 14, and has a plurality of slits or grooves 145 extending between a plurality of co-planar sheet segments 146. Opposed parallel edges of the segments 146 can be either turned upwardly and outwardly, as shown in full outline at 147, or alternatively, can be inclined inwardly as shown in broken outline at 147.1. It can be seen that inclining the edges upwardly or downwardly as shown at 147 or 147.1 increases stiffness of the edge, in a manner similar to a dimple, and would probably improve flow characteristics similar to a dimple.

Figure 12:
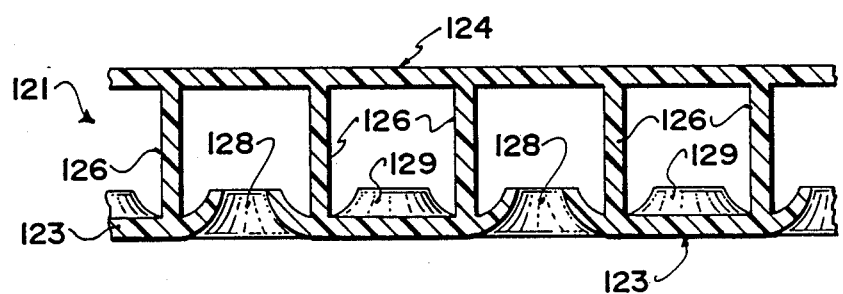
FIG. 12 is a fragmented, simplified cross-sectional view, generally similar to the view of FIG. 5, showing dimples of a second embodiment of a panel member.

While the figure illustrates the segments of the top sheet provided with outwardly turned edges 147, if the panel 144 were to be used with sheet segments having inwardly turned edges, the panel would be inverted so that the first sheet portion with perforations would be the lower sheet portion, similarly to the configuration as shown in FIG. 12.

FIG. 16

Partitions of the previously described panel members have been shown to be disposed parallel to each other, and to extend generally perpendicularly between the spaced apart first and second sheet portions. Panels of this type are easily available commerciallY under the previously mentioned trademarks. A fifth embodiment 149 of a panel member has a plurality of inclined partitions 150 extending between first and second sheet portions 151 and 152 as shown. A commercially available panel with generally triangular partitions and resembling the basic structure above is sold under trademark "Danaplon". The inclined partitions 150 form a series of zig-zags extending between the sheet members which provides strength advantages in certain applications, but has some limitations for the Present application. For example, the fifth embodiment 149 has a plurality of triangular-shaped, upper or first and lower or second edge openings 153 and 154 which are generally adjacent the first and second sheet portions respectively. It can be seen that the first edge openings 153 communicate with respective first ducts 156 which extend adjacent the first panel portion and communicate with apertures 158 passing through the first panel. On the other hand, the lower edge openings 154 communicate with second ducts 159 which extend adjacent the second sheet portion and are separated from the first ducts 156 by the inclined partitions. Clearly, the first and second ducts alternate along the width of the panel member and divide the interior space between the first and second sheet portions into two separate volumes as follows. The first volume, comprising the first ducts 156, communicates with the apertures 158 and communicates with the upper edge openings 153. The second volume, comprising the second ducts 159, communicates with the lower edge openings 154 and is isolated from the apertures, and thus does not participate in fluid exchange, thus reducing effective volume of the ducts. This may not be a problem in some applications where adequate duct cross-sectional duct area is available.

Alternatively, if it is necessary to provide communication with the second ducts 159, additional apertures 161 could be provided which would penetrate through the inclined partitions 150 so as to provide access to both ducts. This would permit utilization of the full volume of interior space between the first and second sheet portions similarly to the previously described embodiments of the panel members.

As can be seen, the invention is versatile, lightweight and can be produced at relatively little cost. Furthermore, the two main components, namely the perforated sheet panels, and the manifold members, can be easily cut to size using conventional hand or power tools, and bonded together to permit installation in a wide variety of sites. It can be used in many applications requiring supply of gas or liquids to a site or porous material, or removal of gas or liquids from such site or porous material. It can also be used to add or remove fluid from other fluid flows, in a controlled amount, for example to provide a controlled flow of water to fish spawning channels or trays. For example, gravel can be placed on panels having upwardly disposed perforations, and a controlled upward flow of water can flow through the perforations and the gravel bed, which itself is swept with a conventional separate lateral flow of water, thus augmenting the supply of clean water to enhance incubating of fish eggs.

I claim:

1. An apparatus for conducting fluid, the apparatus comprising:
   (a) an integral first panel member having:
      first and second relatively stiff non-porous sheet portions, the first sheet portion having a plurality of relatively stiff spacer means for maintaining the second sheet portion spaces apart from said first sheet portion to define a plurality of interior spaces therebetween; the sheet portions and the spacer means being sufficiently stiff to resist deformation due to fluid pressure differences thereacross and to imposed loads, the panel member also having first and second end portions in which at least one of said end portions has a first opening, said first opening and said plurality of apertures communicating with said interior space;
   (b) a first manifold member having:
      a wall with an interior portion surrounding an inside space, and an exterior portion, an end opening communicating with said inside space, and a connecting means for sealably connecting said manifold member to the first panel member, the connecting means being complementary to the end portion of the panel to receive the end portion of the panel, the connecting means including at least one opening in said wall for communicating between said inside space and said first opening of said first panel member to pass fluid between the manifold member and the panel member with negligible leakage therefrom.

2. An apparatus as claimed in claim 1, wherein the spacer means for maintaining the sheet portions spaced apart includes a plurality of spaced apart partitions extending between the first and second sheet portions to define a plurality of ducts between the sheet portions.

3. An apparatus as claimed in claim 2 wherein the ducts are parallel to each other and disposed generally normally to the manifold member.

4. An apparatus as claimed in claim 3 wherein the partitions extend from the first end portion to the second end portion to form a plurality of ducts, the apertures being in communication with said ducts.

5. An apparatus as claimed in claim 4 wherein each duct is in communication with a plurality of apertures.

6. An apparatus as claimed in claim 4 wherein the ducts have first end openings corresponding with the first openings.

7. An apparatus as claimed in claim 4 wherein the ducts have first and second end openings corresponding with the first and second openings in the first and second end portions respectively of the first panel member.

8. An apparatus as claimed in claim 4 wherein the ducts are rectangular in cross section.

9. An apparatus as claimed in claim 4 wherein the ducts are triangular in cross section.

10. An apparatus as claimed in claim 1 wherein the connecting means are releasable for removing said manifold from the first panel member.

11. An apparatus as claimed in claim 1 wherein the connecting means for sealably connecting the manifold member to the first panel member is releasable and includes: the exterior portion of the wall having an elongated first slot, the first slot having spaced apart first and second side portions, spacing between the side portions of the slot being slightly greater than thickness of the panel member so that the first slot is operable to receive an end portion of the first panel member therein.

12. An apparatus as claimed in claim 11 wherein the first bottom portion has a plurality of openings spaced therealong, the openings extending between the interior portion of the wall and the bottom portion of the slot, the openings further being in communication with the edge openings of the panel member when the panel member is inserted into the slot.

13. An apparatus as claimed in claim 11 wherein the said connecting means includes a resilient flap extending inwardly from the first side portion of the slot to effect sealing.

14. An apparatus as claimed in claim 1 wherein the manifold member includes a plurality of similar connecting means for sealably connecting said manifold member to a plurality of panel members, the connecting means being angularly spaced apart.

15. An apparatus as claimed in claim 1 wherein the manifold member includes:
   (a) a first connecting means for sealably connecting the first panel member to the manifold member;
   (b) a second similar connecting means for sealably connecting a second panel member to the manifold member, the first and second connecting means being spaced diametrically apart so as to maintain the first and second panel members within a similar plane.

16. An apparatus as claimed in claim 1 wherein the manifold member includes first and second similar connecting means for connecting to the manifold member first and second panel members respectively, the first and second connecting means being angularly spaced at approximately ninety degrees apart so as to maintain the first and second panel members disposed at approximately ninety degrees to each other.

17. An apparatus as claimed in claim 1 in which the apertures are generally circular openings defined by dimpled edges which project inwardly towards the interior space.

18. An apparatus as claimed in claim 1 in which the apertures are generally circular openings defined by dimpled edges which project outwardly away from the interior space.

19. An apparatus as claimed in claim 2 in which the apertures include a plurality of relatively narrow, laterally spaced apart slots extending across the first sheet portion to divide the sheet portion into a plurality of spaced panel segments, so that the slots intersect essentially all the ducts.

20. An apparatus for conducting fluid, the apparatus comprising:
(a) an integral first panel member having:
first and second relatively stiff, non-porous sheet portions; the first sheet portion having a plurality of apertures therein in which each aperture has a dimple; a plurality of spaced apart, relatively stiff partitions extending between the first and second sheet portions to maintain the second sheet portion spaced apart from said first sheet portion, the first and second sheet portions defining an interior space therebetween, the partitions forming a plurality of ducts in said interior space, the panel member having first and second end portions having a plurality of edge openings which communicate with the ducts, the ducts communicating with the plurality of apertures and terminating in the edge openings in said first and second end portions of said first panel member;
(b) a manifold member having:
a wall with an interior portion surrounding an inside space and an exterior portion; an end opening communicating with said inside space, and connecting means for removably and sealably connecting said manifold member to the first panel member, the connecting means including a first slot in the exterior portion of the wall, the first slot having first and second side portions and a first bottom portion, spacing between the side portions of the slot being slightly greater than the thickness of the panel member the first side portion having a resilient flap to effect sealing, the connecting means further including a plurality of openings extending between the interior portion of the wall and the bottom of the slot, the openings being in communication with the edge openings of the first panel member when the first panel member is inserted in the slot.

21. An apparatus for conducting fluid, the apparatus comprising:
(a) an integral first panel member having:
first and second relatively stiff, non-porous sheet portions, the first sheet portion having a plurality of apertures therein; a plurality of relatively stiff spacer means for maintaining the second sheet portions spaced apart from said first sheet portion to define a plurality of interior spaces therebetween; the sheet portions and spacer means being sufficiently stiff to resist deformation due to fluid pressure differences thereacross and to imposed loads, the panel member also having first and second end portions in which at least one of said end portions has a first opening, said first opening and said plurality of apertures communicating with said interior space;
(b) a first manifold member having;
a wall with an interior portion surrounding an inside space, and an exterior portion; an end opening communicating with said inside space; and a connecting means for releasably and sealably connecting said manifold members to the first panel member, the connecting means being a recess which is generally complementary to the end portion of the panel to receive the end portion of the panel therein, the recess having a bottom portion having at least one opening therein for communication between said inside space and said first opening of said first panel member to pass fluid through the manifold member and the panel member with negligible leakage therethrough,
(c) the first panel member having a surface area much greater than the surface area of the first manifold member to expose a large volume of surrounding medium to the first panel member, so as to facilitate conduction of fluid relative to the surrounding medium through the plurality of apertures in the first sheet portion of the panel member.

22. An apparatus as claimed in claim 1 in which the first panel member has a surface area much greater than surface area of the first manifold member, to expose a large area of surrounding medium to the first panel member so as to facilitate conduction of fluid relative to the surrounding medium through the plurality of apertures in the first sheet portion of the panel member.

* * * * *